(12) United States Patent
Inoue et al.

(10) Patent No.: US 11,465,608 B2
(45) Date of Patent: Oct. 11, 2022

(54) CONTROL DEVICE OF VEHICLE

(71) Applicant: HONDA MOTOR CO., LTD., Tokyo (JP)

(72) Inventors: Mamiko Inoue, Saitama (JP); Kentaro Shiraki, Saitama (JP); Tatsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 17/184,088

(22) Filed: Feb. 24, 2021

(65) Prior Publication Data
US 2021/0269013 A1    Sep. 2, 2021

(30) Foreign Application Priority Data
Mar. 2, 2020  (JP) .............................. JP2020-035285

(51) Int. Cl.
*B60W 20/20*   (2016.01)
*B60W 50/00*   (2006.01)
*B60K 6/442*   (2007.10)

(52) U.S. Cl.
CPC ............ *B60W 20/20* (2013.01); *B60K 6/442* (2013.01); *B60W 50/0097* (2013.01); *B60W 2710/0644* (2013.01); *B60W 2720/106* (2013.01); *B60Y 2200/92* (2013.01); *B60Y 2300/182* (2013.01)

(58) Field of Classification Search
CPC ............ B60W 20/20; B60W 50/0097; B60W 2710/0644; B60W 2720/106; B60K 6/442; B60Y 2200/92; B60Y 2300/182
See application file for complete search history.

(56) References Cited

U.S. PATENT DOCUMENTS

| | | | |
|---|---|---|---|
| 11,104,326 B1* | 8/2021 | Inoue .................. | B60K 6/387 |
| 2020/0122712 A1 | 4/2020 | Miki et al. | |
| 2021/0269012 A1* | 9/2021 | Inoue .................. | B60K 6/387 |
| 2021/0269014 A1* | 9/2021 | Inoue .................. | B60W 20/17 |

FOREIGN PATENT DOCUMENTS

WO    WO 2019/003443 A1    1/2019

* cited by examiner

*Primary Examiner* — Tisha D Lewis
(74) *Attorney, Agent, or Firm* — Paratus Law Group, PLLC

(57) ABSTRACT

A control device of a vehicle capable of traveling according to a plurality of traveling modes including a first traveling mode and a second traveling mode is provided. The control device includes a traveling mode control unit and an internal combustion engine control unit. The internal combustion engine control unit increases a rotational speed of a internal combustion engine at a predetermined increase rate as a vehicle speed increases when the vehicle is traveling in the first traveling mode. The traveling mode control unit includes a prediction increase rate acquisition unit configured to acquire a prediction increase rate, and a transition prohibition setting unit configured to prohibit transition to the second traveling mode when a transition condition is satisfied, based on the prediction increase rate acquired by the prediction increase rate acquisition unit and the increase rate.

5 Claims, 7 Drawing Sheets

CONTROL DEVICE OF VEHICLE

CROSS-REFERENCE TO RELATED APPLICATIONS

The present application claims priority from Japanese Patent Application No. 2020-035285 filed on Mar. 2, 2020, the entire content of which is incorporated herein by reference.

TECHNICAL FIELD

The present invention relates to a control device of a vehicle.

BACKGROUND

In recent years, a hybrid electrical vehicle has a plurality of traveling modes including a hybrid traveling mode in which a generator generates electric power based on power of an engine in a state where a clutch is disengaged, and an electric motor outputs power at least based on the electric power supplied by the generator to drive a driving wheel, and an engine traveling mode in which the driving wheel is driven by at least power output by the engine in a state where the clutch is engaged (for example, see WO 2019/003443).

SUMMARY

However, in WO 2019/003443, no consideration is given to an operating sound of the engine when shifting from a series traveling mode to the engine traveling mode, and there is a room for improvement in this point. For example, when there is no continuity between the operating sound of the engine in the series traveling mode and the operating sound of the engine in the engine traveling mode, a change in the operating sound of the engine when the traveling mode is shifted from the series traveling mode to the engine traveling mode becomes unnatural, which may give a sense of discomfort to a driver.

An object of the present invention is to provide a control device of a vehicle capable of preventing transition of a traveling mode accompanied by an unnatural change in an operating sound of an internal combustion engine.

According to an aspect of the present invention, there is provided a control device of a vehicle capable of traveling according to a plurality of traveling modes, the plurality of traveling modes including a first traveling mode in which in response to supply of electric power generated by a generator, power output by an electric motor is transmitted to a driving wheel to drive the vehicle, the generator generating the electric power using power of an internal combustion engine; and a second traveling mode in which power of the internal combustion engine is transmitted to the driving wheel to drive the vehicle, the control device including: a traveling mode control unit configured to set, based on a traveling state of the vehicle, any one of the plurality of traveling modes as a traveling mode in which the vehicle travels; and an internal combustion engine control unit configured to control the internal combustion engine, wherein the internal combustion engine control unit increases a rotational speed of the internal combustion engine at a predetermined increase rate as a vehicle speed increases when the vehicle is traveling in the first traveling mode, and wherein the traveling mode control unit includes a prediction increase rate acquisition unit configured to, when the vehicle is traveling in the first traveling mode, in accordance with establishment of a transition condition to the second traveling mode based on the traveling state of the vehicle, acquire a prediction increase rate, which is a prediction value of an increase rate of the rotational speed of the internal combustion engine, in a case where the traveling mode is shifted to the second traveling mode when the transition condition is satisfied, and a transition prohibition setting unit configured to prohibit transition to the second traveling mode when the transition condition is satisfied, based on the prediction increase rate acquired by the prediction increase rate acquisition unit and the increase rate.

According to the present invention, in a case where the transition condition to the second traveling mode is satisfied while the vehicle is traveling in the first traveling mode, the transition to the second traveling mode when the transition condition is satisfied can be prohibited based on the prediction increase rate of the rotational speed of the internal combustion engine in a case where the traveling mode is shifted to the second traveling mode when the transition condition is satisfied and the increase rate of the rotational speed of the internal combustion engine in the first traveling mode. This makes it possible to prevent the transition from the first traveling mode to the second traveling mode accompanied by an unnatural change in an operating sound of the internal combustion engine.

DESCRIPTION OF EMBODIMENTS

Hereinafter, an embodiment of a control device of a vehicle according to the present invention will be described in detail with reference to the drawings.

Figure 1:
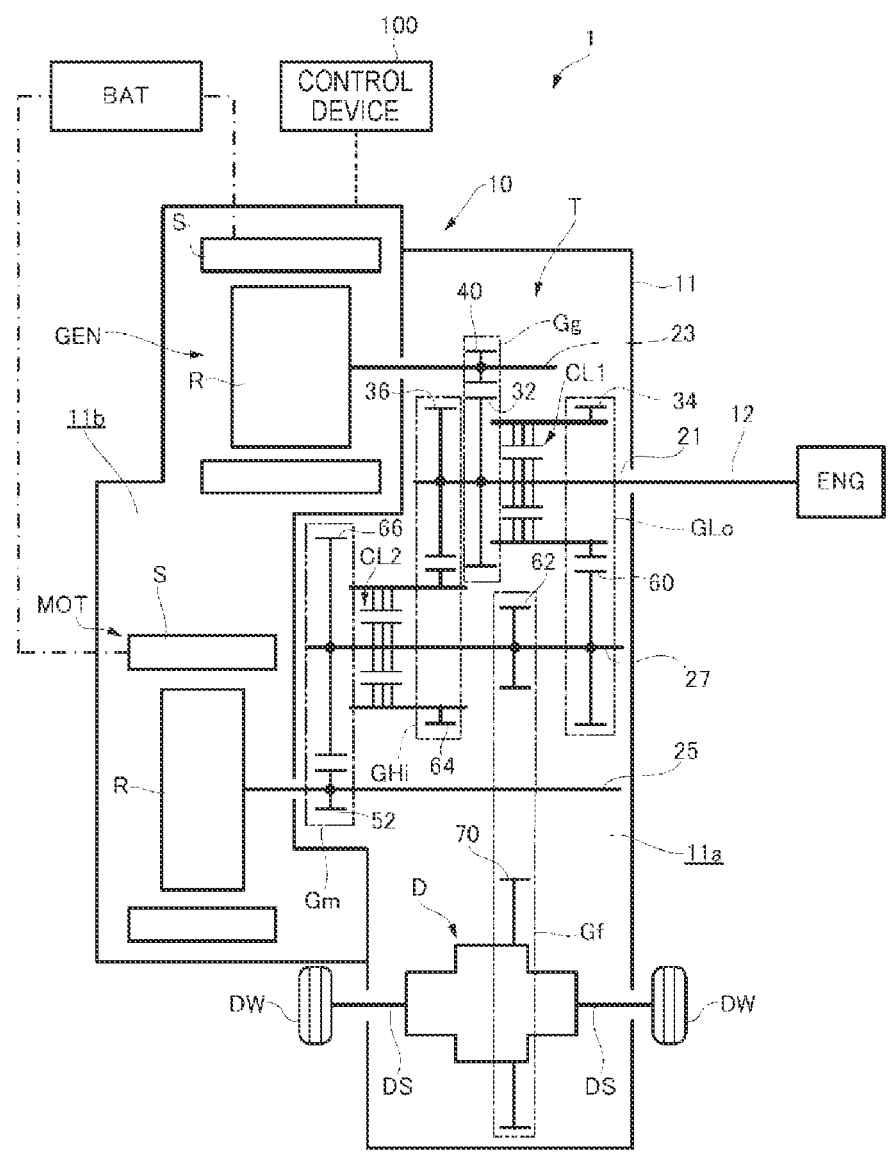
FIG. 1 is a diagram showing a schematic configuration of a vehicle including a control device of a vehicle according to an embodiment of the present invention.

First, a vehicle including the control device of a vehicle according to the present embodiment will be described with reference to FIG. 1. As shown in FIG. 1, a vehicle 1 according to the present embodiment includes a driving device 10 that outputs a driving force for the vehicle 1 to travel, and a control device 100 that controls the entire vehicle 1 including the driving device 10.

[Driving Device]

As shown in FIG. 1, the driving device 10 includes an engine ENG, a generator GEN, a motor MOT, a transmission T, and a case 11 that accommodates the generator GEN, the motor MOT, and the transmission T. The motor MOT and the generator GEN are connected to a battery BAT included in the vehicle 1, which enables electric power supply from the battery BAT and energy regeneration to the battery BAT.

[Transmission]

The case 11 is provided with a transmission accommodating chamber 11a for accommodating the transmission T and a motor accommodating chamber 11b for accommodating the motor MOT and the generator GEN from the engine ENG side along an axial direction.

The transmission accommodating chamber 11a accommodates an input shaft 21, a generator shaft 23, a motor shaft 25, a counter shaft 27, and a differential mechanism D arranged in parallel to each other.

The input shaft 21 is arranged coaxially with and adjacently to a crankshaft 12 of the engine ENG. A driving force of the crankshaft 12 is transmitted to the input shaft 21 via a damper (not shown). The input shaft 21 is provided with a generator drive gear 32 constituting a generator gear train Gg.

The input shaft 21 is provided with a low-speed side drive gear 34 constituting a low-speed side engine gear train GLo via a first clutch CL1 on the engine side with respect to the generator drive gear 32, and a high-speed side drive gear 36 constituting a high-speed side engine gear train GHi on a side opposite to the engine side (hereinafter, referred to as a motor side). The first clutch CL1 is a hydraulic clutch for detachably connecting the input shaft 21 and the low-speed side drive gear 34, and is a so-called multi-plate friction type clutch.

The generator shaft 23 is provided with a generator driven gear 40 that meshes with the generator drive gear 32. The generator drive gear 32 of the input shaft 21 and the generator driven gear 40 of the generator shaft 23 constitute a generator gear train Gg for transmitting a rotation of the input shaft 21 to the generator shaft 23. The generator GEN is arranged on the motor side of the generator shaft 23. The generator GEN includes a rotor R fixed to the generator shaft 23 and a stator S fixed to the case 11 and arranged to face an outer diameter side of the rotor R.

When the rotation of the input shaft 21 is transmitted to the generator shaft 23 via the generator gear train Gg, the rotor R of the generator GEN rotates due to the rotation of the generator shaft 23. Accordingly, when the engine ENG is driven, power of the engine ENG input from the input shaft 21 can be converted into electric power by the generator GEN.

The motor shaft 25 is provided with a motor drive gear 52 constituting a motor gear train Gm. The motor MOT is arranged on the motor shaft 25 closer to the motor side than the motor drive gear 52. The motor MOT includes a rotor R fixed to the motor shaft 25 and a stator S fixed to the case 11 and arranged to face an outer diameter side of the rotor R.

The counter shaft 27 is provided with, in an order from the engine side, a low-speed side driven gear 60 meshing with the low-speed side drive gear 34, an output gear 62 meshing with a ring gear 70 of the differential mechanism D, a high-speed side driven gear 64 meshing with the high-speed side drive gear 36 of the input shaft 21 via a second clutch CL2, and a motor driven gear 66 meshing with the motor drive gear 52 of the motor shaft 25. The second clutch CL2 is a hydraulic clutch for detachably connecting the counter shaft 27 and the high-speed side driven gear 64, and is a so-called multi-plate friction type clutch.

The low-speed side drive gear 34 of the input shaft 21 and the low-speed side driven gear 60 of the counter shaft 27 constitute a low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute a high-speed side engine gear train GHi for transmitting the rotation of the input shaft 21 to the counter shaft 27. Here, the low-speed side engine gear train GLo including the low-speed side drive gear 34 and the low-speed side driven gear 60 has a higher reduction ratio than the high-speed side engine gear train GHi including the high-speed side drive gear 36 and the high-speed side driven gear 64.

Therefore, when the first clutch CL1 is engaged and the second clutch CL2 is disengaged at the time of driving the engine ENG, the driving force of the engine ENG is transmitted to the counter shaft 27 via the low-speed side engine gear train GLo at a high reduction ratio. Meanwhile, when the first clutch CL1 is disengaged and the second clutch CL2 is engaged at the time of driving the engine ENG, the driving force of the engine ENG is transmitted to the counter shaft 27 via the high-speed side engine gear train GHi at a low reduction ratio. Note that the first clutch CL1 and the second clutch CL2 are not engaged at the same time.

The motor drive gear 52 of the motor shaft 25 and the motor driven gear 66 of the counter shaft 27 constitute the motor gear train Gm for transmitting the rotation of the motor shaft 25 to the counter shaft 27. When the rotor R of the motor MOT is rotated, the rotation of the input shaft 21 is transmitted to the counter shaft 27 via the motor gear train Gm. Accordingly, when the motor MOT is driven, the driving force of the motor MOT is transmitted to the counter shaft 27 via the motor gear train Gm.

The output gear 62 of the counter shaft 27 and the ring gear 70 of the differential mechanism D constitute a final gear train Gf for transmitting a rotation of the counter shaft 27 to the differential mechanism D. Therefore, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for the vehicle 1 to travel is output via a pair of driving wheels DW provided at both ends of the axle DS.

The driving device 10 configured as described above has a power transmission path for transmitting the driving force of the motor MOT to the axle DS (that is, the driving wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the driving device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors included in the vehicle 1, and controls the driving device 10 based on the acquired vehicle information.

Here, the vehicle information includes information indicating a traveling state of the vehicle 1. For example, the vehicle information includes, as the information indicating the traveling state of the vehicle 1, information indicating a speed of the vehicle 1 (hereinafter, also referred to as a vehicle speed), an accelerator pedal (AP) opening degree indicating an operation amount (that is, an accelerator position) with respect to an accelerator pedal provided in the vehicle 1, a required driving force of the vehicle 1 derived based on the vehicle speed, the AP opening and the like, the rotational speed of the engine ENG (hereinafter referred to as "the engine rotational speed"), and the like. In addition, the vehicle information further includes battery information related to the battery BAT included in the vehicle 1. The battery information includes, for example, information indicating a state of charge (SOC) of the battery BAT.

The control device 100 controls the driving device 10 based on the vehicle information to cause the vehicle 1 to travel in any of the plurality of traveling modes that the vehicle 1 can take. In the control of the driving device 10, for example, the control device 100 controls the output of power from the engine ENG by controlling the supply of fuel to the engine ENG, controls the output of power from the motor MOT by controlling the supply of electric power to the motor MOT, and controls the generation of power (for example, output voltage) of the generator GEN by controlling a field current or the like flowing through a coil of the generator GEN.

In the control of the driving device 10, the control device 100 controls the first clutch CL1 to be disengaged or engaged by controlling an actuator (not shown) that operates the first clutch CL1. Similarly, the control device 100 controls the second clutch CL2 to be disengaged or engaged by controlling an actuator (not shown) that operates the second clutch CL2.

In this way, by controlling the engine ENG, the generator GEN, the motor MOT, the first clutch CL1 and the second clutch CL2, the control device 100 can cause the vehicle 1 to travel in any of the plurality of traveling modes that the vehicle 1 can take. The control device 100 is an example of the control device of a vehicle according to the present invention, and is realized by an electronic control unit (ECU) including a processor, a memory, an interface, and the like, for example.

[Traveling Mode that Vehicle can Take]

Figure 2:
FIG. 2 is a diagram showing the contents of each traveling mode.

Next, a traveling mode that the vehicle 1 can take will be described with reference to FIG. 2. In FIG. 2, as shown in a traveling mode table Ta, the vehicle 1 can take the plurality of traveling modes including the EV traveling mode, the hybrid traveling mode, the low-speed side engine traveling mode, and the high-speed side engine traveling mode.

[EV Traveling Mode]

The EV traveling mode is a traveling mode in which electric power is supplied to the motor MOT from the battery BAT, and the vehicle 1 is driven by the power output from the motor MOT in accordance with the electric power.

Specifically, in the EV traveling mode, the control device 100 controls both the first clutch CL1 and the second clutch CL2 to be disengaged. In the EV traveling mode, the control device 100 performs a control such that injection of fuel to the engine ENG is stopped (so-called fuel cut), and the output of the power from the engine ENG is stopped. In the EV traveling mode, the control device 100 performs a control such that electric power is supplied to the motor MOT from the battery BAT, and power corresponding to the electric power is output to the motor MOT (shown as motor: "driven by battery"). As a result, in the EV traveling mode, the vehicle 1 travels by power that is output from the motor MOT according the electric power supplied from the battery BAT.

In the EV traveling mode, as described above, the output of the power from the engine ENG is stopped, and both the first clutch CL1 and the second clutch CL2 are disengaged. Therefore, in the EV traveling mode, no power is input to the generator GEN, and the generator GEN does not generate power (shown as generator: "stop power generation").

[Hybrid Traveling Mode]

The hybrid traveling mode is an example of a first traveling mode in the present invention, and is a traveling mode in which electric power is supplied to the motor MOT at least from the generator GEN, and the vehicle 1 travels by the power output from the motor MOT in accordance with the electric power.

Specifically, in the case of the hybrid traveling mode, the control device 100 controls both the first clutch CL1 and the second clutch CL2 to be disengaged. In the case of the hybrid traveling mode, the control device 100 causes fuel to inject to the engine ENG to output power from the engine ENG. The power output from the engine ENG is input to the generator GEN via the generator gear train Gg. As a result, power generation by the generator GEN is performed.

In a case of the hybrid traveling mode, the control device 100 performs a control such that the electric power generated by the generator GEN is supplied to the motor MOT, and power corresponding to the electric power is output to the motor MOT (shown as motor: "driven by generator"). The electric power supplied from the generator GEN to the motor MOT is greater than the electric power supplied from the battery BAT to the motor MOT. Therefore, in the hybrid traveling mode, the power output from the motor MOT (driving force of the motor MOT) can be increased as compared with the EV traveling mode, and a large driving force can be obtained as the driving force of the vehicle 1.

In the case of the hybrid traveling mode, the control device 100 may perform a control such that the electric power is supplied from the battery BAT to the motor MOT if necessary. That is, in the hybrid traveling mode, the control device 100 may perform a control such that electric power is supplied from both the generator GEN and the battery BAT to the motor MOT. As a result, the electric power supplied to the motor MOT can be increased compared to a case where electric power is supplied to the motor MOT only from the generator GEN, and a greater driving force can be obtained as the driving force of the vehicle 1.

In addition, even in the hybrid traveling mode, in order to provide a driver with a natural feeling in which the vehicle speed and an operating sound of the engine ENG are in conjunction with each other, as will be described later, the control device 100 controls the engine rotational speed such that when the engine rotational speed reaches a predetermined upper limit rotational speed, the engine rotational speed is temporarily lowered to a predetermined lower limit rotational speed and then the engine rotational speed is increased again. A specific control example of the engine rotational speed in the hybrid traveling mode will be described later with reference to FIG. 3.

[Low-Speed Side Engine Traveling Mode]

The low-speed side engine traveling mode is an example of a second traveling mode in the present invention, and is a traveling mode in which the power output from the engine ENG is transmitted to the driving wheels DW via the low-speed side power transmission path to drive the vehicle 1.

Specifically, in the case of the low-speed side engine traveling mode, the control device 100 perform a control such that fuel is injected to the engine ENG and power is output from the engine ENG. In addition, in the case of the low-speed side engine traveling mode, the control device 100 controls the first clutch CL1 to be engaged and the second clutch CL2 to be disengaged. Therefore, in the low-speed side engine traveling mode, the power output from the engine ENG is transmitted to the driving wheels DW via the low-speed side engine gear train GLo, the final gear train Gf, and the differential mechanism D to drive the vehicle 1.

In the case of the low-speed side engine traveling mode, the power output from the engine ENG is also input to the generator GEN via the generator gear train Gg, but the generator GEN is controlled so as not to generate power. For example, in the low-speed side engine traveling mode, a switching element (for example, a switching element of an inverter device provided between the generator GEN and the battery BAT) provided in an electric power transmission path between the generator GEN and the battery BAT is turned off so that the generator GEN is controlled so as not to generate power. Accordingly, in the low-speed side engine traveling mode, loss caused by power generation of the generator GEN can be reduced, and an amount of heat generated by the generator GEN or the like can be reduced. In the low-speed side engine traveling mode, during braking of the vehicle 1, regenerative power generation may be performed by the motor MOT to charge the battery BAT with the generated electric power.

In the case of the low-speed side engine traveling mode, for example, the control device 100 stops the supply of electric power to the motor MOT, and stops the output of the power from the motor MOT. As a result, in the low-speed side engine traveling mode, a load on the motor MOT can be reduced, and an amount of heat generated by the motor MOT can be reduced.

In the case of the low-speed side engine traveling mode, the control device 100 may perform a control such that the electric power is supplied from the battery BAT to the motor MOT if necessary. Therefore, in the low-speed side engine traveling mode, the vehicle 1 can travel using the power output from the motor MOT by the electric power supplied from the battery BAT, and as compared with the case where the vehicle 1 travels by only the power of the engine ENG, a greater driving force can be obtained as the driving force of the vehicle 1.

[High-Speed Side Engine Traveling Mode]

The high-speed side engine traveling mode is a traveling mode in which the power output from the engine ENG is transmitted to the driving wheels DW via the high-speed side power transmission path to drive the vehicle 1.

Specifically, in the case of the high-speed side engine traveling mode, the control device 100 performs a control such that fuel is injected to the engine ENG and power is output from the engine ENG. In addition, in the case of the high-speed side engine traveling mode, the control device 100 controls the second clutch CL2 to be engaged and the first clutch CL1 to be disengaged. Thus, in the high-speed side engine traveling mode, the power output from the engine ENG is transmitted to the driving wheels DW via the high-speed side engine gear train GHi, the final gear train Gf, and the differential mechanism D to drive the vehicle 1.

In the case of the high-speed side engine traveling mode, the power output from the engine ENG is also input to the generator GEN via the generator gear train Gg, but the generator GEN is controlled so as not to generate power. As a result, in the high-speed side engine traveling mode, the loss caused by the power generation of the generator GEN can be reduced, and the amount of heat generated by the generator GEN or the like can be reduced. Even in the high-speed side engine traveling mode, during braking of the vehicle 1, regenerative power generation may be performed by the motor MOT to charge the battery BAT with the generated electric power.

In the case of the high-speed side engine traveling mode, for example, the control device 100 stops the supply of electric power to the motor MOT, and stops the output of the power from the motor MOT. As a result, in the high-speed side engine traveling mode, the load on the motor MOT can be reduced, and the amount of heat generated by the motor MOT can be reduced.

In the case of the high-speed side engine traveling mode, the control device 100 may perform a control such that the electric power is supplied from the battery BAT to the motor MOT if necessary. Thus, in the high-speed side engine traveling mode, the vehicle 1 can also travel using the power output from the motor MOT based on the electric power supplied from the battery BAT, and as compared with the case where the vehicle 1 travels by only the power of the engine ENG, a greater driving force can be obtained as the driving force of the vehicle 1.

[Engine Rotational Speed in Hybrid Traveling Mode]

Figure 3:
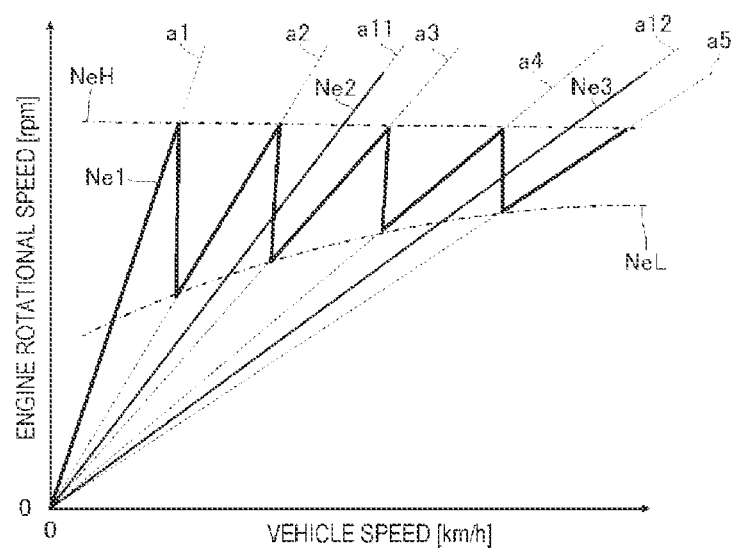
FIG. 3 is a diagram showing a control example of an engine rotational speed in a hybrid traveling mode.

Next, a control example of the engine rotational speed in the hybrid traveling mode will be described with reference to FIG. 3. In FIG. 3, a vertical axis indicates the engine rotational speed [rpm], and a horizontal axis indicates the vehicle speed [km/h].

An engine rotational speed Ne1 shown in FIG. 3 is an engine rotational speed in the hybrid traveling mode. As indicated by the engine rotational speed Ne1, in the case of the hybrid traveling mode, the control device 100 performs a controls such that the engine rotational speed fluctuates between predetermined upper limit rotational speed NeH and lower limit rotational speed NeL, for example, by an engine control unit 131 to be described later.

Specifically, in the case of the hybrid traveling mode, the control device 100 first increases the engine rotational speed as the vehicle speed increases at a predetermined increase rate a1 from a state where both the vehicle speed and the engine rotational speed are 0 (zero). Then, when the engine rotational speed reaches the upper limit rotational speed NeH corresponding to the vehicle speed at that time, the engine rotational speed is decreased to the lower limit rotational speed NeL corresponding to the vehicle speed at that time. After that, the control device 100 increases the engine rotational speed from the lower limit rotational speed NeL as the vehicle speed increases again. However, at this time, the engine rotational speed is increased at an increase rate a2 smaller than the increase rate a1.

In the same way thereafter, the control device 100 decreases the engine rotational speed up to the lower limit rotational speed NeL when the engine rotational speed reaches the upper limit rotational speed NeH, and as the vehicle speed increases, increases the engine rotational speed while changing the increase rate to an increase rate a3, an increase rate a4, and an increase rate a5 each time. Here, the increase rate a2>the increase rate a3>the increase rate a4>the increase rate a5.

In the hybrid traveling mode, since both the first clutch CL1 and the second clutch CL2 are disengaged as described above, the engine rotational speed can be set freely regardless of the vehicle speed. However, by controlling the engine rotational speed so as to fluctuate between the upper limit rotational speed NeH and the lower limit rotational speed NeL as the vehicle speed increases, the driver can feel a natural change in the operating sound of the engine ENG in conjunction with the vehicle speed as if the gear is shifted by a stepped transmission even the vehicle 1 is traveling in the hybrid traveling mode.

The engine rotational speed Ne2 shown in FIG. 3 is an engine rotational speed in the low-speed side engine traveling mode. As described above, in the low-speed side engine traveling mode, the engine ENG and the axle DS (that is, the driving wheels DW) are mechanically connected. Therefore, as indicated by the engine rotational speed Ne2, the engine rotational speed and the vehicle speed linearly correspond to each other. Specifically, in the present embodiment, in the case of the low-speed side engine traveling mode, the engine rotational speed increases at an increase rate a11 as the vehicle speed increases. For example, here, the increase rate a2>the increase rate a11>the increase rate a3.

An engine rotational speed Ne3 shown in FIG. 3 is an engine rotational speed in the high-speed side engine traveling mode. As described above, in the high-speed side engine traveling mode, the engine ENG and the axle DS are mechanically connected in the same manner as the low-speed side engine traveling mode. Therefore, as indicated by the engine rotational speed Ne3, the engine rotational speed and the vehicle speed linearly correspond to each other. Specifically, in the present embodiment, in the case of the high-speed side engine traveling mode, the engine rotational speed increases at an increase rate a12 as the vehicle speed increases. For example, here, the increase rate a4>the increase rate a12>the increase rate a5.

Although the engine rotational speed Ne2 and the engine rotational speed Ne3 in a state where the vehicle speed is 0 (zero) are shown in FIG. 3 for the sake of convenience, the low-speed side engine traveling mode or the high-speed side engine traveling mode may not be actually set when the vehicle speed is 0 (zero).

[Functional Configuration of Control Device]

Figure 4:
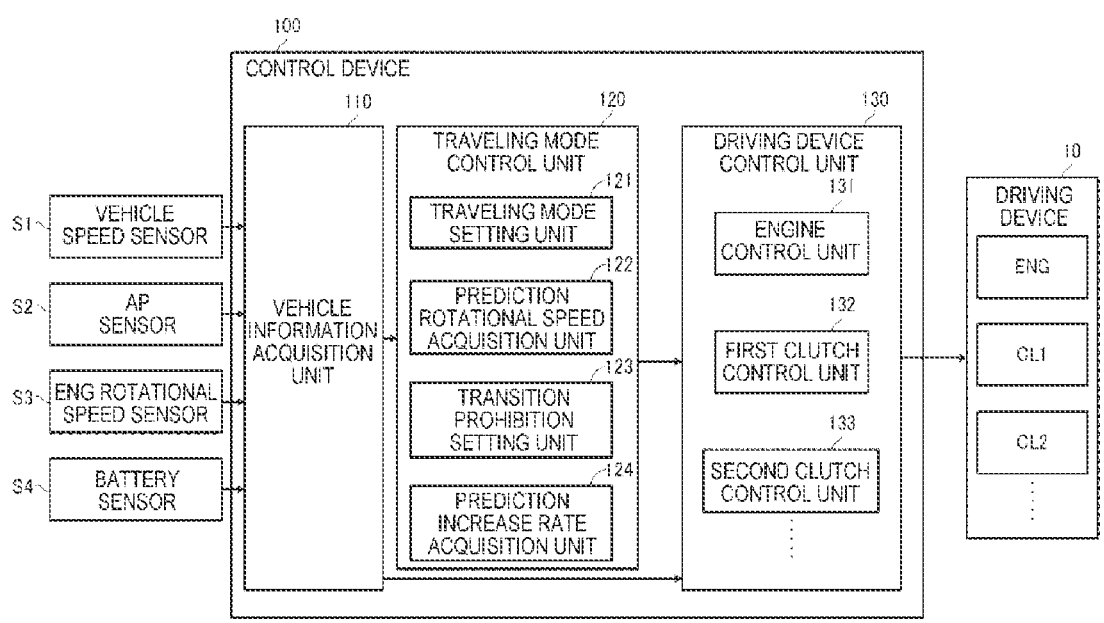
FIG. 4 is a block diagram showing a functional configuration of the control device.

Next, a functional configuration of the control device 100 will be described with reference to FIG. 4. As shown in FIG. 4, the control device 100 includes a vehicle information acquisition unit 110 that acquires the vehicle information, a traveling mode control unit 120 that controls the traveling mode in the vehicle 1, and a driving device control unit 130 that controls the driving device 10.

For example, the vehicle information acquisition unit 110, the traveling mode control unit 120, and the driving device control unit 130 can realize the functions thereof by executing programs stored in a memory by a processor of the ECU that implements the control device 100, or by an interface of the ECU.

The vehicle information acquisition unit 110 acquires vehicle information based on detection signals or the like sent from various sensors included in the vehicle 1 to the control device 100, and transmits the acquired vehicle information to the traveling mode control unit 120 and the driving device control unit 130. As described above, the vehicle information includes information indicating the traveling state of the vehicle 1 such as the vehicle speed, the AP opening degree, and the engine rotational speed. Therefore, the vehicle information acquisition unit 110 can notify the traveling mode control unit 120 and the driving device control unit 130 of the traveling state of the vehicle 1.

For example, the vehicle speed can be acquired based on a detection signal from a vehicle speed sensor S1 that detects a rotational speed of the axle DS. The AP opening degree can be acquired based on a detection signal from an accelerator position sensor (AP sensor) S2 that detects an operation amount with respect to the accelerator pedal provided in the vehicle 1. The engine rotational speed can be acquired based on a detection signal from an engine rotational speed sensor (ENG rotational speed sensor) S3 that detects the engine rotational speed. Further, the vehicle information acquisition unit 110 may derive a required driving force of the vehicle 1 based on the vehicle speed, the AP opening degree, and the like, and acquire vehicle information including information indicating the derived required driving force.

The vehicle information further includes the battery information. The battery information includes information indicating the SOC of the battery BAT. Specifically, the vehicle 1 includes a battery sensor S4 that detects an inter-terminal voltage, a charge/discharge current, a temperature of the battery BAT, and the like of the battery BAT. The battery sensor S4 transmits detection signals indicating the detected signals to the control device 100. The vehicle information acquisition unit 110 derives the SOC of the battery BAT based on the inter-terminal voltage, the charge/discharge current, the temperature, and the like of the battery BAT detected by the battery sensor S4, and acquires the battery information including information indicating the derived SOC. In addition, the battery information may include information indicating the inter-terminal voltage, the charge/discharge current, the temperature, and the like of the battery BAT detected by the battery sensor S4.

The traveling mode control unit 120 includes a traveling mode setting unit 121, a prediction rotational speed acquisition unit 122, a transition prohibition setting unit 123, and a prediction increase rate acquisition unit 124. Based on the traveling state of the vehicle 1, the traveling mode setting unit 121 sets any traveling mode among the plurality of traveling modes described above as the traveling mode for driving the vehicle 1.

Specifically, the control device 100 stores in advance information indicating a transition condition that is a condition for transition to each of the traveling modes described above. The information indicating the transition condition is configured such that information indicating, for example, a traveling mode before the transition (for example, the hybrid traveling mode), a transition destination traveling mode (for example, the low-speed side engine traveling mode), and a traveling state of the vehicle 1 that is a transition condition from the traveling mode before the transition to the transition destination traveling mode (for example, the vehicle speed or the driving force of the vehicle 1) are associated with one another. The traveling mode setting unit 121 sets a traveling mode for driving the vehicle 1 with reference to the traveling state of the vehicle 1 indicated by the vehicle information, the current traveling mode of the vehicle 1, and the information indicating the above-described transition condition.

For example, it is assumed that the traveling state of the vehicle 1 traveling in the hybrid traveling mode is changed so as to match the traveling state of the vehicle 1 that is a transition condition from the hybrid traveling mode to the low-speed side engine traveling mode. In this case, the traveling mode setting unit 121 shifts the traveling mode of the vehicle 1 from the hybrid traveling mode to the low-speed side engine traveling mode when the transition condition from the hybrid traveling mode to the low-speed side engine traveling mode is satisfied. Specifically, in this case, the traveling mode setting unit 121 shifts the traveling mode from the hybrid traveling mode to the low-speed side engine traveling mode by the driving device control unit 130 controlling the first clutch CL1 to be engaged.

Hereinafter, the transition condition from the hybrid traveling mode to the low-speed side engine traveling mode is also simply referred to as a "transition condition from the hybrid traveling mode to the low-speed side engine traveling mode". Hereinafter, the transition from the hybrid traveling mode to the low-speed side engine traveling mode is simply referred to as a "transition to the low-speed side engine traveling mode".

As described above, in the hybrid traveling mode in which the axle DS (that is, the driving wheel DW) and the engine ENG are not mechanically connected and the engine rotational speed fluctuates between the upper limit rotational speed NeH and the lower limit rotational speed NeL, the engine rotational speed may be the upper limit rotational speed NeH even if the vehicle speed is in a low speed range, or the engine rotational speed may be the lower limit rotational speed NeL even if the vehicle speed is in a high speed range.

On the other hand, in the low-speed side engine traveling mode in which the axle DS and the engine ENG are mechanically connected, the engine rotational speed is linearly related to the vehicle speed. That is, in the low-speed side engine traveling mode, since the engine rotational speed monotonously increases in accordance with an increase in the vehicle speed, the engine ENG does not rotate at a high speed when the vehicle speed is in the low speed range, and the engine ENG does not rotate at a low speed w % ben the vehicle speed is in the high speed range.

Due to such a difference in characteristics of the engine rotational speed in the hybrid traveling mode and the low-speed side engine traveling mode, when the transition to the low-speed side engine traveling mode is performed when the transition condition to the low-speed side engine traveling mode is satisfied, there is a possibility that a sudden fluctuation in the engine rotational speed that is not intended by the driver may occur along with the transition. Such a sudden fluctuation in the engine rotational speed may lead to a reduction in marketability of the vehicle 1 from a viewpoint of vibration and noise, that is, from a so-called noise vibration (NV) viewpoint.

Therefore, in a case where it is predicted that the sudden fluctuation in the engine rotational speed occurs due to the transition to the low-speed side engine traveling mode even if the transition condition to the low-speed side engine traveling mode is satisfied, the traveling mode control unit 120 prohibits the transition to the low-speed side engine traveling mode so as not to perform the transition.

Specifically, in a case where the transition condition to the low-speed side engine traveling mode is satisfied based on the traveling state of the vehicle 1 that is traveling in the hybrid traveling mode, the prediction rotational speed acquisition unit 122 included in the traveling mode control unit 120 acquires a prediction rotational speed that is a prediction value of the engine rotational speed in a case where the traveling mode is shifted to the low-speed side engine traveling mode when the transition condition is satisfied.

For example, the control device 100 stores in advance correspondence information indicating a correspondence relationship between the vehicle speed and the engine rotational speed in the low-speed side engine traveling mode. The prediction rotational speed acquisition unit 122 acquires, as the prediction rotational speed, the engine rotational speed corresponding to the vehicle speed indicated by the vehicle information with reference to the correspondence information.

For example, it is assumed that the vehicle speed when the transition condition to the low-speed side engine traveling mode is satisfied is vX. Further, it is assumed that in the correspondence information, the engine rotational speed corresponding to the vehicle speed vX is NeX. In this case, the prediction rotational speed acquisition unit 122 acquires NeX corresponding to vX in the correspondence information described above as the prediction rotational speed in the case where the traveling mode is shifted to the low-speed side engine traveling mode when the transition condition to the low-speed side engine traveling mode is satisfied.

Then, the transition prohibition setting unit 123 included in the traveling mode control unit 120 prohibits the transition to the low-speed side engine traveling mode based on the engine rotational speed when the transition condition to the low-speed side engine traveling mode is satisfied and the prediction rotational speed in the case where the traveling mode is shifted to the low-speed side engine traveling mode when the transition condition is satisfied.

Specifically, the transition prohibition setting unit 123 determines whether a difference between the engine rotational speed when the transition condition to the low-speed side engine traveling mode is satisfied and the prediction rotational speed in the case where the traveling mode is shifted to the low-speed side engine traveling mode when the transition condition is satisfied is equal to or greater than a threshold value. The threshold value is determined in advance in consideration of, for example, an upper limit value of a fluctuation width of the engine rotational speed allowed from the NV viewpoint, and is stored in the control device 100.

The transition prohibition setting unit 123 prohibits the transition to the low-speed side engine traveling mode in a case where the difference between the engine rotational speed when the transition condition to the low-speed side engine traveling mode is satisfied and the prediction rotational speed in the case where the traveling mode is shifted to the low-speed side engine traveling mode when the transition condition is satisfied is equal to or greater than the threshold value.

For example, it is assumed that the vehicle speed is vX and the engine rotational speed is NeY when the transition condition to the low-speed side engine traveling mode is satisfied. In this case, as described above, NeX is acquired as the prediction rotational speed. Therefore, the transition prohibition setting unit 123 determines whether the difference between NeY, which is the engine rotational speed when the transition condition to the low-speed side engine traveling mode is satisfied, and NeX, which is the prediction rotational speed in the case where the traveling mode is shifted to the low-speed side engine traveling mode when the transition condition is satisfied is equal to or greater than the threshold value.

That is, here, when the threshold value is set to Th, the transition prohibition setting unit 123 determines whether-|NeY−NeX|≥Th. and prohibits the transition to the low-speed side engine traveling mode if NeY−NeX|≥Th. In this way, when the transition to the low-speed side engine traveling mode is prohibited by the transition prohibition setting unit 123, the traveling mode setting unit 121 does not perform the transition to the low-speed side engine traveling mode even if the transition condition to the low-speed side engine traveling mode is satisfied. As a result, the traveling mode setting unit 121 can prevent the traveling mode to the low-speed side engine traveling mode which leads to occurrence of the sudden fluctuation in the engine rotational speed that is not intended by the driver.

When the transition to the low-speed side engine traveling mode is prohibited by the transition prohibition setting unit 123, the prediction rotational speed acquisition unit 122 periodically acquires the prediction rotational speed in the case where the traveling mode is shifted to the low-speed side engine traveling mode in a traveling state at that time. Then, when the prediction rotational speed is acquired by the prediction rotational speed acquisition unit 122, the transition prohibition setting unit 123 determines whether the difference between the prediction rotational speed and the engine rotational speed at that time is smaller than the threshold value. When it is determined by this determination that the difference between the prediction rotational speed and the engine rotational speed at that time is smaller than the threshold value, the transition prohibition setting unit 123 cancels the prohibition of the transition to the low-speed side engine traveling mode from the viewpoint of the engine rotational speed. However, as will be described below, the transition prohibition setting unit 123 may prohibit the transition to the low-speed side engine traveling mode not only from the viewpoint of the engine rotational speed but also from the viewpoint of the increase rate of the engine rotational speed.

For example, when there is no continuity between the operating sound of the engine ENG in the hybrid traveling mode and the operating sound of the engine ENG in the low-speed side engine traveling mode, a change in the operating sound of the engine ENG when the traveling mode is shifted from the hybrid traveling mode to the low-speed side engine traveling mode becomes unnatural, which may give a sense of discomfort to the driver.

Therefore, the traveling mode control unit 120 prohibits the transition to the low-speed side engine traveling mode when the transition condition is satisfied, based on the increase rate of the engine rotational speed in the hybrid traveling mode when the transition condition to the low-speed side engine traveling mode is satisfied and a prediction increase rate that is a prediction value of the increase rate of the engine rotational speed in the case where the traveling mode is shifted to the low-speed side engine traveling mode when the transition condition is satisfied.

Specifically, when the vehicle 1 is traveling in the hybrid traveling mode, the prediction increase rate acquisition unit 124 included in the traveling mode control unit 120 acquires the prediction increase rate in the case where the traveling mode is shifted to the low-speed side engine traveling mode when the transition condition is satisfied in accordance with the establishment of the transition condition to the low-speed side engine traveling mode based on the traveling state of the vehicle 1. Here, the prediction increase rate is, for example, an increase rate of the engine rotational speed with respect to time.

For example, as described above, the control device 100 stores in advance the correspondence information indicating the correspondence relationship between the vehicle speed and the engine rotational speed in the low-speed side engine traveling mode. The prediction increase rate acquisition unit 124 can acquire an increase rate of the engine rotational speed with respect to the vehicle speed in the low-speed side engine traveling mode with reference to the correspondence information. Then, the prediction increase rate acquisition unit 124 can acquire the prediction increase rate from the increase rate of the engine rotational speed with respect to the vehicle speed in the low-speed side engine traveling mode and the traveling state of the vehicle 1 when the transition condition to the low-speed side engine traveling mode is satisfied.

Specifically, for example, it is assumed that the vehicle 1 accelerates at a constant acceleration in a traveling direction when the transition condition to the low-speed side engine traveling mode is satisfied. In this case, the prediction increase rate acquisition unit 124 can acquire the prediction increase rate from the acceleration and the increase rate of the engine rotational speed with respect to the vehicle speed in the low-speed side engine traveling mode described above. The acceleration in the traveling direction of the vehicle 1 can be obtained, for example, from an amount of change in the vehicle speed per unit time.

The transition prohibition setting unit 123 prohibits the transition to the low-speed side engine traveling mode when the transition condition is satisfied, based on the prediction increase rate acquired by the prediction increase rate acquisition unit 124 and the increase rate of the engine rotational speed in the hybrid traveling mode when the transition condition to the low-speed side engine traveling mode is satisfied. Here, the increase rate of the engine rotational speed in the hybrid traveling mode when the transition condition to the low-speed side engine traveling mode is satisfied is, for example, an increase rate of the engine rotational speed with respect to time.

Specifically, as described above, when in the hybrid traveling mode, the control device 100 performs a control such that the engine rotational speed increases at any of the increase rates a1 to a5 as the vehicle speed increases when the vehicle is traveling in the hybrid traveling mode. The transition prohibition setting unit 123 can acquire the increase rate of the engine rotational speed in the hybrid traveling mode when the transition condition is satisfied, based on the increase rate among the increase rates a1 to a5, which is used when the transition condition to the low-speed side engine traveling mode is satisfied and the traveling state of the vehicle 1 when the transition condition is satisfied (for example, the acceleration with respect to the traveling direction of the vehicle 1 described above).

For example, in a case where a magnitude of the prediction increase rate does not fall within a predetermined range based on a magnitude of the increase rate of the engine rotational speed in the hybrid traveling mode when the transition condition to the low-speed side engine traveling mode is satisfied, the transition prohibition setting unit 123 prohibits the transition to the low-speed side engine traveling mode when the transition condition is satisfied. Here, the predetermined range is determined in advance by a manufacturer of the vehicle 1, for example. As a result, it is possible to prevent the transition to the low-speed side engine traveling mode in which the operating sound of the engine ENG changes greatly before and after the transition.

When the vehicle 1 accelerates when the transition condition to the low-speed side engine traveling mode is satisfied, the transition prohibition setting unit 123 may prohibit the transition to the low-speed side engine traveling mode when the transition condition is satisfied if the prediction increase rate is larger than the increase rate of the engine rotational speed in the hybrid traveling mode when the transition condition is satisfied. An example in which the transition prohibition setting unit 123 prohibits the transition to the low-speed side engine traveling mode based on the prediction increase rate and the increase rate of the engine rotational speed will be described later with reference to FIGS. 5 and 6.

For example, the transition prohibition setting unit 123 does not prohibit the transition to the low-speed side engine traveling mode in a case where the difference between the engine rotational speed when the transition condition to the low-speed side engine traveling mode is satisfied and the prediction rotational speed in the case where the traveling mode is shifted to the low-speed side engine traveling mode when the transition condition is satisfied is less than the threshold value described above, and the magnitude of the prediction increase rate falls within the predetermined range based on the magnitude of the increase rate of the engine rotational speed in the hybrid traveling mode when the transition condition to the low-speed side engine traveling mode is satisfied. Therefore, in a case where these conditions are satisfied, the traveling mode setting unit 121 shifts the traveling mode to the low-speed side engine traveling mode when the transition condition to the low-speed side engine traveling mode is satisfied. As a result, the vehicle 1 can be efficiently driven in the low-speed side engine traveling mode in accordance with the traveling state of the vehicle 1.

The driving device control unit 130 controls the driving device 10 based on the traveling mode set by the traveling mode control unit 120 (the traveling mode setting unit 121), the vehicle information acquired by the vehicle information acquisition unit 110, and the like. Specifically, the driving device control unit 130 includes an engine control unit 131 that controls the engine ENG, a first clutch control unit 132 that controls the first clutch CL1, a second clutch control unit 133 that controls the second clutch CL2, and the like.

For example, in the case of the low-speed side engine traveling mode or the high-speed side engine traveling mode, the engine control unit 131 controls the engine ENG so as to output the driving force for realizing the required driving force indicated by the vehicle information to the engine ENG.

In the case of the hybrid traveling mode, the engine control unit 131 controls the engine ENG (that is, power generation of the generator in this case) such that the motor MOT outputs a driving force for realizing the required driving force indicated by the vehicle information. Further, in the case of the hybrid traveling mode, the engine control unit 131 performs the control such that the engine rotational speed fluctuates between the predetermined upper limit rotational speed NeH and lower limit rotational speed NeL as described with reference to FIG. 3 and the like.

The first clutch control unit 132 controls the engagement and disengagement of the first clutch CL1 in accordance with the traveling mode set by the traveling mode control unit 120 (the traveling mode setting unit 121). Specifically, as described above, the first clutch control unit 132 controls the first clutch CL1 to be engaged in response to being set to the low-speed side engine traveling mode, and controls the first clutch CL1 to be disengaged in response to being set to another traveling mode.

Similarly to the first clutch control unit 132, the second clutch control unit 133 also controls the engagement and disengagement of the second clutch CL2 in accordance with the traveling mode set by the traveling mode control unit 120. Specifically, as described above, the second clutch control unit 133 controls the second clutch CL2 to be engaged in response to being set to the high-speed side engine traveling mode, and controls the second clutch CL2 to be disengaged in response to being set to another traveling mode.

Figure 5:
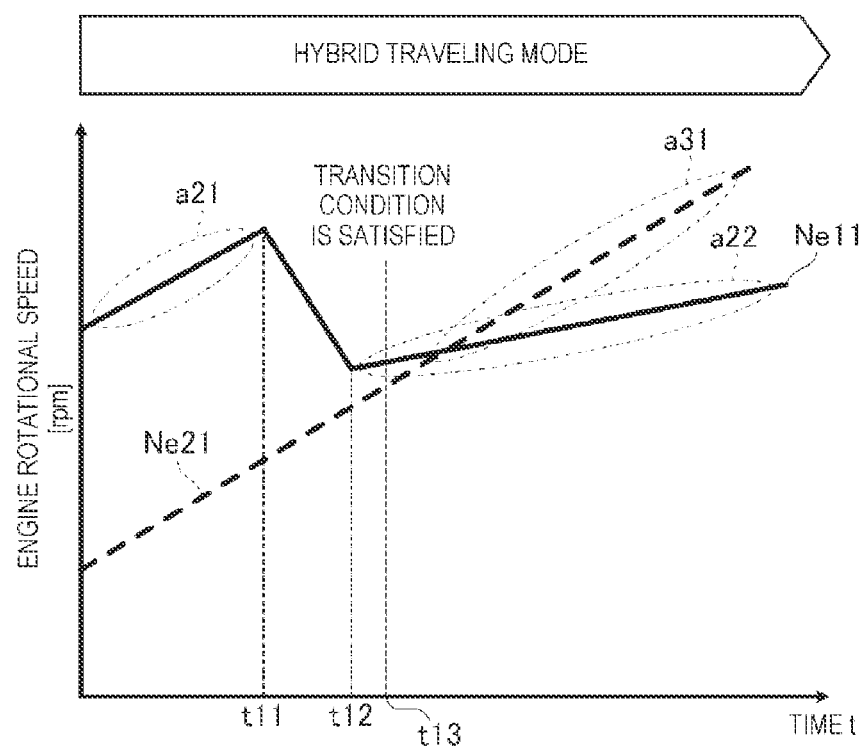
FIG. 5 is a diagram showing a first example in a case of prohibiting transition to a low-speed side engine traveling mode.

First Example in Case of Prohibiting Transition to Low-Speed Side Engine Traveling Mode Next, a first example in a case where the transition to the low-speed side engine traveling mode is prohibited will be described with reference to FIG. 5. In FIG. 5, a vertical axis indicates the engine rotational speed [rpm], and a horizontal axis indicates time t. In the example of FIG. 5 described here, it is assumed that the vehicle 1 is traveling in the hybrid traveling mode while accelerating at a constant acceleration in the traveling direction.

In FIG. 5, an engine rotational speed Ne11 is an engine rotational speed at each time point in FIG. 5. In the case where the vehicle 1 is traveling in the hybrid traveling mode while accelerating at the constant acceleration, the engine rotational speed Ne11 is controlled so as to fluctuate between the upper limit rotational speed NeH and the lower limit rotational speed NeL as described above with the increase in the vehicle speed, that is, passage of time. In FIG. 5, the upper limit rotational speed NeH and the lower limit rotational speed NeL are not shown.

Specifically, the engine rotational speed Ne11 increases at an increase rate a21 with the passage of time until a time point t11 when the engine rotational speed Ne11 reaches the upper limit rotational speed NeH. Then, the engine rotational speed Ne11 increases at an increase rate a22 with the passage of time from a time point t12 when the engine rotational speed reaches the upper limit rotational speed NeH and then lowers to the lower limit rotational speed NeL. Here, the increase rate a22 is smaller than the increase rate a21.

In FIG. 5, a prediction rotational speed Ne21 is a prediction rotational speed corresponding to the vehicle speed at each time point in FIG. 5. That is, the prediction rotational speed Ne21 is an engine rotational speed when the low-speed side engine traveling mode is set at each time point in FIG. 5. In the case where the vehicle 1 is traveling while accelerating at the constant acceleration, the prediction rotational speed Ne21 monotonously increases at an increase rate a31 with the increase in the vehicle speed, that is, the passage of time. Here, it is assumed that the increase rate a31 is larger than the increase rate a22 as shown in FIG. 5.

It is assumed that the transition condition to the low-speed side engine traveling mode is satisfied at a time point t13 when the engine rotational speed Ne11 is controlled to increase at the increase rate a22 after the time point t12. If the transition to the low-speed side engine traveling mode is performed at the time point t13, the increase rate in the engine rotational speed is changed from the increase rate a22 to the increase rate a31 with the transition as an opportunity.

That is, when the transition to the low-speed side engine traveling mode is performed at the time point t13, due to the transition, the operating sound of the engine ENG changes as if a shift down operation is performed in the vehicle having a stepped transmission even though the vehicle 1 is accelerating. Such a change in the operating sound of the engine ENG leads to a sense of discomfort of the driver. Therefore, in the case of the example of FIG. 5, the control device 100 prohibits the transition to the low-speed side engine traveling mode at the time point t13 so as not to perform the transition. That is, as shown in FIG. 5, the control device 100 causes the vehicle 1 to travel in the hybrid traveling mode after the time point t13.

Specifically, in the case of the example of FIG. 5, the increase rate a22 is acquired as the increase rate of the engine rotational speed at the time point t13 when the transition condition to the low-speed side engine traveling mode is satisfied. In addition, the increase rate a31 is acquired as the prediction increase rate in the case of shifting to the low-speed side engine traveling mode at the time point t13 when the transition condition to the low-speed side engine traveling mode is satisfied.

In the case of the example of FIG. 5, since the vehicle 1 is traveling while accelerating, the transition prohibition setting unit 123 compares the acquired increase rate a22 with the increase rate a31, and in a case where the increase ratio a31 is larger than the increase rate a22, prohibits the transition to the low-speed side engine traveling mode at the time point t13. As a result, even though the vehicle 1 is accelerating, it is possible to prevent the transition to the low-speed side engine traveling mode in which the operating sound of the engine ENG changes as if the shift down operation is performed.

Figure 6:
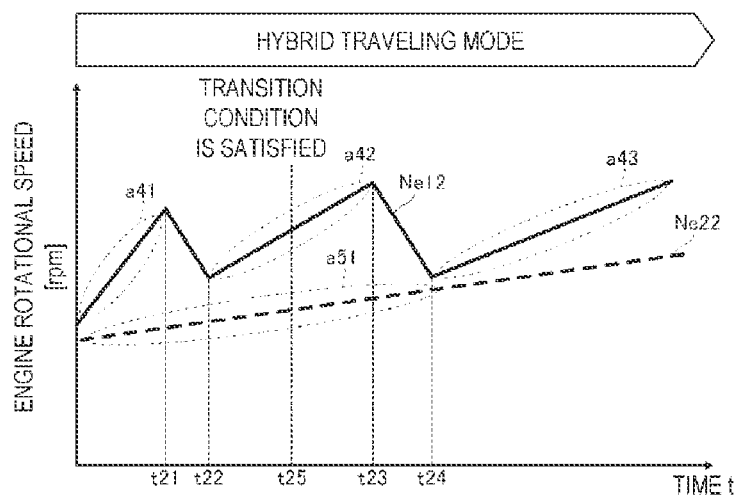
FIG. 6 is a diagram showing a second example in a case of prohibiting the transition to the low-speed side engine traveling mode.

Second Example in Case of Prohibiting Transition to Low-Speed Side Engine Traveling Mode Next, a second example in a case where the transition to the low-speed side engine traveling mode is prohibited will be described with reference to FIG. 6. In FIG. 6, a vertical axis indicates the engine rotational speed [rpm], and a horizontal axis indicates time t. In the example of FIG. 6 described here, it is assumed that the vehicle 1 is traveling in the hybrid traveling mode while accelerating at a constant acceleration in the traveling direction.

In FIG. 6, an engine rotational speed Ne12 is an engine rotational speed at each time point in FIG. 6. In the case where the vehicle 1 is traveling in the hybrid traveling mode while accelerating at a constant acceleration, the engine rotational speed Ne12 is controlled so as to fluctuate between the upper limit rotational speed NeH and the lower limit rotational speed NeL as described above with the increase in the vehicle speed, that is, passage of time. In FIG. 6, the upper limit rotational speed NeH and the lower limit rotational speed NeL are not shown.

Specifically, in the example of FIG. 6, the engine rotational speed Ne12 is controlled to increase at an increase rate a41 with the passage of time until a time point t21 when the engine rotational speed Ne12 reaches the upper limit rotational speed NeH. Then, the engine rotational speed Ne12 increases at an increase rate a42 with the passage of time from a time point t22 when the engine rotational speed reaches the upper limit rotational speed NeH at the time point t21 and then lowers to the lower limit rotational speed NeL. Here, the increase rate a42 is smaller than the increase rate a41.

The engine rotational speed Ne12 increases at an increase rate a43 with the passage of time from a time point t24 when the engine rotational speed reaches the upper limit rotational speed NeH at a time point t23 and then lowers to the lower limit rotational speed NeL. Here, the increase rate a43 is smaller than the increase rate a42.

In FIG. 6, a prediction rotational speed Ne22 is a prediction rotational speed corresponding to the vehicle speed at each time point in FIG. 6. That is, the prediction rotational speed Ne22 is an engine rotational speed when the low-speed side engine traveling mode is set at each time point in FIG. 6. In the case where the vehicle 1 is traveling while accelerating at the constant acceleration, the prediction rotational speed Ne22 monotonically increases at an increase rate a51 with the increase in the vehicle speed, that is, the passage of time. Here, the increase rate a51 is smaller than the increase rate a42 as shown in FIG. 6, and is, for example, smaller than the increase rate a43.

It is assumed that the transition condition to the low-speed side engine traveling mode is satisfied at a time point t25 when the engine rotational speed Ne12 is controlled to increase at the increase rate a42, which is a time point between the time point t22 and the time point t23. If the transition to the low-speed side engine traveling mode is performed at the time point t25, the increase rate in the engine rotational speed is changed from the increase rate a42 to the increase rate a51 with the transition as an opportunity.

That is, when the transition to the low-speed side engine traveling mode is performed at the time point t25, due to the transition, the operating sound of the engine ENG changes as if a shift up operation is performed in the vehicle having a stepped transmission. In particular, if the increase rate a51 is smaller than the increase rate a43, the operating sound of the engine ENG changes as if the vehicle is suddenly shifted up to a step of a plurality of steps. Such a change in the operating sound of the engine ENG may lead to a sense of discomfort of the driver. Therefore, in the case of the example of FIG. 6, the control device 100 prohibits the transition to the low-speed side engine traveling mode at the time point t25 so as not to perform the transition. That is, as shown in FIG. 6, the control device 100 causes the vehicle 1 to travel in the hybrid traveling mode after the time point t25.

Specifically, in the case of the example of FIG. 6, the increase rate a42 is acquired as the increase rate of the engine rotational speed at the time point t25 when the transition condition to the low-speed side engine traveling mode is satisfied. In addition, the increase rate a51 is acquired as the prediction increase rate in the case of shifting to the low-speed side engine traveling mode at the time point t25 when the transition condition to the low-speed side engine traveling mode is satisfied.

In the case of the example of FIG. 6, the transition prohibition setting unit 123 compares the acquired increase rate a42 with the increase rate a51, and in a case where the increase ratio a51 is smaller than the increase rate a42 by a predetermined amount or more (for example, in the case where the increase ratio a51 is smaller than the increase rate a43), prohibits the transition to the low-speed side engine traveling mode at the time point t25. As a result, it is possible to prevent the transition to the low-speed side engine traveling mode accompanied by a unnatural change in the operating sound of the engine ENG (for example, a change in the operating sound of the engine ENG as if the vehicle is suddenly shifted up to a shift of the plurality of steps).

Example of Performing Transition to Low-Speed Side Engine Traveling Mode

Figure 7:
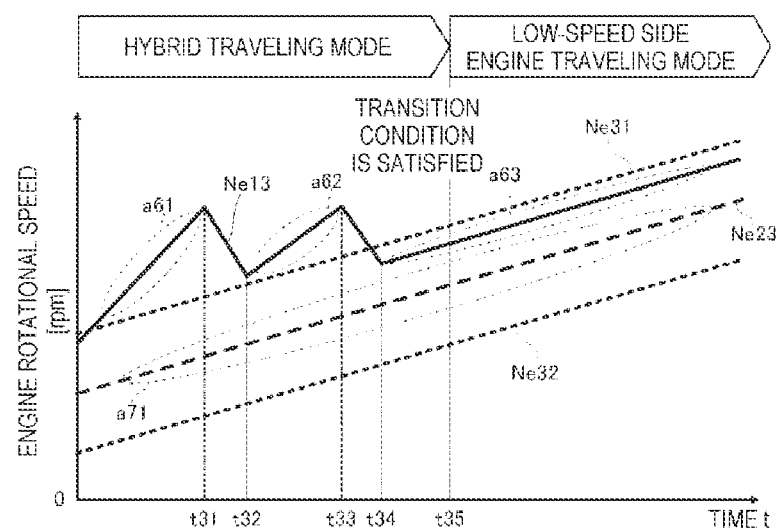
FIG. 7 is a diagram showing an example in a case of performing the transition to the low-speed side engine traveling mode.

Next, an example in a case where the transition to the low-speed side engine traveling mode is performed will be described with reference to FIG. 7. In FIG. 7, a vertical axis indicates the engine rotational speed [rpm], and a horizontal axis indicates time t. In the example of FIG. 7 described here, it is assumed that the vehicle 1 is traveling while accelerating at a constant acceleration in the traveling direction.

In FIG. 7, an engine rotational speed Ne13 is an engine rotational speed when the hybrid traveling mode is set at each time point in FIG. 7. The engine rotational speed Ne13 fluctuates between the upper limit rotational speed NeH and the lower limit rotational speed NeL as described above with the increase in the vehicle speed, that is, the passage of time. In FIG. 7, the upper limit rotational speed NeH and the lower limit rotational speed NeL are not shown.

Specifically, the engine rotational speed Ne13 increases at an increase rate a61 with the passage of time until a time point t31 when the engine rotational speed Ne13 reaches the upper limit rotational speed NeH. Then, the engine rotational speed Ne13 increases at an increase rate a62 with the passage of time from a time point t32 when the engine rotational speed reaches the upper limit rotational speed NeH at the time point t31 and then lowers to the lower limit rotational speed NeL. Here, the increase rate a62 is smaller than the increase rate a61. Then, the engine rotational speed Ne13 increases at an increase rate a63 with the passage of time from a time point t34 when the engine rotational speed reaches the upper limit rotational speed NeH at a time point t33 after the time point t32 and then lowers to the lower limit rotational speed NeL. Here, the increase rate a63 is smaller than the increase rate a62.

In FIG. 7, a prediction rotational speed Ne23 is a prediction rotational speed corresponding to the vehicle speed at each time point in FIG. 7. That is, the prediction rotational speed Ne23 is an engine rotational speed when the low-speed side engine traveling mode is set at each time point in FIG. 7. In the case where the vehicle 1 is traveling while accelerating at the constant acceleration, the prediction rotational speed Ne23 monotonously increases at an increase rate a71 with the increase in the vehicle speed, that is, the passage of time. Here, a magnitude of the increase rate a71 is substantially the same as a magnitude of the increase rate a63 as shown in FIG. 7, for example.

In FIG. 7, an upper limit value Ne31 is an upper limit value of the engine rotational speed that permits the transition to the low-speed side engine traveling mode. Specifically, the upper limit value Ne31 is a value obtained by adding the threshold value described above to the prediction rotational speed Ne23. In FIG. 7, a lower limit value Ne 32 is a lower limit value of the engine rotational speed that permits the transition to the low-speed side engine traveling mode. Specifically, the lower limit value Ne32 is a value obtained by subtracting the threshold value from the prediction rotational speed Ne23.

It is assumed that the transition condition to the low-speed side engine traveling mode is satisfied at a time point t35 when the vehicle 1 is traveling in the hybrid traveling mode at a time point after the time point t34. Since the engine rotational speed at the time point t35 is a value of the engine rotational speed Ne13 at the time point 35, the engine rotational speed falls between the upper limit value Ne31 and the lower limit value Ne32. Therefore, even if the transition to the low-speed side engine traveling mode is performed in accordance with the establishment of the transition condition at the time point t35, the sudden fluctuation in the engine rotational speed does not occur due to the transition.

The increase rate of the engine rotational speed in the hybrid traveling mode at the time point t35 is the increase rate a63. Then, when the transition to the low-speed side engine traveling mode is performed at the time point t35, the increase rate of the engine rotational speed is changed from the increase rate a63 to the increase rate a71 with the transition as an opportunity. As described above, the increase rate a71 is substantially the same as the increase rate a63. Therefore, even if the transition to the low-speed side engine traveling mode is performed in accordance with the establishment of the transition condition at the time point t35, the continuity of the operating sound of the engine ENG can be secured before and after the transition. Therefore, in the case of the example of FIG. 7, the control device 100 shifts the vehicle 1 to the low-speed side engine traveling mode in accordance with the establishment of the transition condition at the time point 35, and then causes the vehicle 1 to travel in the low-speed side engine traveling mode.

As described above, the control device 100 prohibits the transition to the low-speed side engine traveling mode when the transition condition is satisfied, based on the increase rate of the engine rotational speed in the hybrid traveling mode when the transition condition to the low-speed side engine traveling mode is satisfied and the prediction increase rate in the case where the traveling mode is shifted to the low-speed side engine traveling mode when the transition condition is satisfied. As a result, it is possible to prevent the transition to the low-speed side engine traveling mode accompanied by the unnatural change in the operating sound of the engine ENG.

Although the embodiment of the present invention has been described above, the present invention is not limited to the embodiment described above, and modifications, improvements, or the like can be made as appropriate.

For example, in the embodiment described above, the content of prohibiting the transition from the hybrid traveling mode to the low-speed side engine traveling mode has been described, but the present invention is not limited thereto. In a case of shifting the traveling mode to the high-speed side engine traveling mode when the transition condition from the hybrid traveling mode to the high-speed side engine traveling mode is satisfied, there is also a possibility that the operating sound of the engine ENG changes unnaturally.

Therefore, similarly to the embodiment described above, the control device 100 may acquire the prediction increase rate in the case where the traveling mode is shifted to the high-speed side engine traveling mode when the transition condition to the high-speed side engine traveling mode is satisfied, and prohibit the transition to the high-speed side engine traveling mode when the transition condition is satisfied based on the prediction increase rate and the increase rate of the engine rotational speed when the transition condition to the high-speed side engine traveling mode is satisfied.

For example, it is also conceivable that the sudden fluctuation in the engine rotational speed may occur in accordance with the transition from the hybrid traveling mode to the high-speed side engine traveling mode. Therefore, in the case where it is predicted that the sudden fluctuation in the engine rotational speed occurs due to the transition from the hybrid traveling mode to the high-speed side engine traveling mode, the control device 100 may prohibit this transition.

Specifically, the correspondence information indicating the correspondence relationship between the vehicle speed and the engine rotational speed in the high-speed side engine traveling mode is stored in advance in the control device 100, so that the control device 100 can acquire the prediction rotational speed in the case where the traveling mode is shifted to the high-speed side engine traveling mode with reference to the correspondence information. Then, the control device 100 may determine whether the sudden fluctuation in the engine rotational speed occurs by performing the transition to the high-speed side engine traveling mode based on the prediction rotational speed thus acquired, and in the case where it is determined that the sudden fluctuation occurs, prohibit the transition to the high-speed side engine traveling mode.

Similarly, in a case where it is predicted that the sudden fluctuation in the engine rotational speed occurs in accordance with the transition from the low-speed side engine traveling mode to the high-speed side engine traveling mode or the transition from the high-speed side engine traveling mode to the low-speed side engine traveling mode, the control device 100 may prohibit the transition.

At least the following matters are described in the present specification. Components and the like corresponding to the above-described embodiment are shown in parentheses, but the present invention is not limited thereto.

(1) A control device (control device 100) of a vehicle (vehicle 1) capable of traveling according to a plurality of traveling modes, the plurality of traveling modes including:

a first traveling mode (hybrid traveling mode) in which in response to supply of electric power generated by a generator (generator GEN), power output by an electric motor (motor MOT) is transmitted to a driving wheel (driving wheel DW) to drive the vehicle, the generator generating the electric power using power of an internal combustion engine (engine ENG); and a second traveling mode (low-speed side engine traveling mode) in which power of the internal combustion engine is transmitted to the driving wheel to drive the vehicle, the control device including:

a traveling mode control unit (traveling mode control unit 120) configured to set, based on a traveling state of the vehicle, any one of the plurality of traveling modes as a traveling mode in which the vehicle travels; and an internal combustion engine control unit (engine control unit 131) configured to control the internal combustion engine, wherein the internal combustion engine control unit increases a rotational speed of the internal combustion engine at a predetermined increase rate as a vehicle speed increases when the vehicle is traveling in the first traveling mode, and wherein the traveling mode control unit includes a prediction increase rate acquisition unit (prediction increase rate acquisition unit 124) configured to, when the vehicle is traveling in the first traveling mode, in accordance with establishment of a transition condition to the second traveling mode based on the traveling state of the vehicle, acquire a prediction increase rate, which is a prediction value of an increase rate of the rotational speed of the internal combustion engine, in a case where the traveling mode is shifted to the second traveling mode when the transition condition is satisfied, and a transition prohibition setting unit (transition prohibition setting unit 123) configured to prohibit transition to the second traveling mode when the transition condition is satisfied, based on the prediction increase rate acquired by the prediction increase rate acquisition unit and the increase rate.

According to (1), in a case where the transition condition to the second traveling mode is satisfied while the vehicle is traveling in the first traveling mode, the transition to the second traveling mode when the transition condition is satisfied can be prohibited based on the prediction increase rate of the rotational speed of the internal combustion engine in a case where the traveling mode is shifted to the second traveling mode when the transition condition is satisfied and the increase rate of the rotational speed of the internal combustion engine in the first traveling mode. This makes it possible to prevent the transition from the first traveling mode to the second traveling mode accompanied by an unnatural change in an operating sound of the internal combustion engine.

(2) The control device of a vehicle according to (1), wherein the transition prohibition setting unit prohibits the transition to the second traveling mode when the transition condition is satisfied in a case where a magnitude of the prediction increase rate does not fall within a predetermined range based on a magnitude of the increase rate.

According to (2), in the case where the magnitude of the prediction increase rate does not fall within the predetermined range based on the magnitude of the increase rate of the rotational speed of the internal combustion engine in the first traveling mode, since the transition to the second traveling mode when the transition condition to the second traveling mode is satisfied is prohibited, it is possible to prevent the transition to the second traveling mode in which the operating sound of the internal combustion engine changes greatly before and after the transition.

(3) The control device of a vehicle according to (1) or (2), wherein the traveling mode control unit further includes a prediction rotational speed acquisition unit (prediction rotational speed acquisition unit 122) configured to, in accordance with the establishment of the transition condition to the second traveling mode, acquire a prediction rotational speed, which is a prediction value of the rotational speed of the internal combustion engine in the case where the traveling mode is shifted to the second traveling mode when the transition condition is satisfied, and wherein the transition prohibition setting unit prohibits the transition to the second traveling mode when the transition condition is satisfied in a case where a difference between the prediction rotational speed acquired by the prediction rotational speed acquisition unit and the rotational speed of the internal combustion engine when the transition condition is satisfied is equal to or greater than a threshold value.

According to (3), in the case where the difference between the prediction rotational speed and the rotational speed of the internal combustion engine when the transition condition to the second traveling mode is satisfied is equal to or greater than the threshold value, the transition to the second traveling mode when the transition condition is satisfied is prohibited, so that a sudden fluctuation in the rotational speed of the engine that is not intended by the driver can be prevented by performing the transition.

(4) The control device of a vehicle according to (3), wherein the traveling mode control unit performs the transition to the second traveling mode when the transition condition is satisfied, in a case where the magnitude of the prediction increase rate falls within the predetermined range based on the magnitude of the increase rate and the difference between the prediction rotational speed and the rotational speed of the internal combustion engine when the transition condition is satisfied is smaller than the threshold value.

According to (4), since the transition to the second traveling mode when the transition condition is satisfied is performed in the case where the magnitude of the prediction increase rate falls within the predetermined range based on the magnitude of the increase rate and the difference between the prediction rotational speed and the rotational speed of the internal combustion engine when the transition condition to the second traveling mode is satisfied is smaller than the threshold value, it is possible to shift to the second traveling mode according to the traveling state of the vehicle and to efficiently travel the vehicle while suppressing the occurrence of the sudden fluctuation in the engine rotational speed that is not intended by the driver, without greatly changing in the operating sound of the internal combustion engine before and after the transition to the second traveling mode.

(5) The control device of a vehicle according to any one of (1) to (4), wherein when the vehicle is traveling in the first traveling mode, the internal combustion engine control unit increases the rotational speed of the internal combustion engine to a first rotational speed at a first increase rate with an increase in the vehicle speed, decreases the rotational speed to a second rotational speed lower than the first rotational speed when the first rotational speed is reached, and increases the rotational speed from the second rotational speed at a second increase rate with an increase in the vehicle speed, and wherein the increase rate is an increase rate, among the first increase rate and the second increase rate, when the transition condition is satisfied.

According to (5), when the vehicle is traveling in the first traveling mode, the rotational speed of the internal combustion engine increases to the first rotational speed at the first increase rate with the increase in the vehicle speed, decreases to the second rotational speed lower than the first rotational speed when the first rotational speed is reached, and increases from the second rotational speed at the second increase rate with the increase in the vehicle speed. Since the increase rate described above is the increase rate, among the first increase rate and the second increase rate, when the transition condition to the second traveling mode is satisfied, the transition from the first traveling mode to the second traveling mode can be appropriately prohibited even when a plurality of variations are provided in the increase rate of the rotational speed of the internal combustion engine in the first traveling mode.

What is claimed is:

1. A control device of a vehicle capable of traveling according to a plurality of traveling modes,
    the plurality of traveling modes including:
        a first traveling mode in which in response to supply of electric power generated by a generator, power output by an electric motor is transmitted to a driving wheel to drive the vehicle, the generator generating the electric power using power of an internal combustion engine; and
        a second traveling mode in which power of the internal combustion engine is transmitted to the driving wheel to drive the vehicle,
    the control device comprising:
    a traveling mode control unit configured to set, based on a traveling state of the vehicle, any one of the plurality of traveling modes as a traveling mode in which the vehicle travels; and
    an internal combustion engine control unit configured to control the internal combustion engine,
    wherein the internal combustion engine control unit increases a rotational speed of the internal combustion engine at a predetermined increase rate as a vehicle speed increases when the vehicle is traveling in the first traveling mode, and
    wherein the traveling mode control unit includes
        a prediction increase rate acquisition unit configured to, when the vehicle is traveling in the first traveling mode, in accordance with establishment of a transition condition to the second traveling mode based on the traveling state of the vehicle, acquire a prediction increase rate, which is a prediction value of an increase rate of the rotational speed of the internal combustion engine, in a case where the traveling mode is shifted to the second traveling mode when the transition condition is satisfied, and
        a transition prohibition setting unit configured to prohibit transition to the second traveling mode when the transition condition is satisfied, based on the prediction increase rate acquired by the prediction increase rate acquisition unit and the increase rate.

2. The control device of a vehicle according to claim 1, wherein the transition prohibition setting unit prohibits the transition to the second traveling mode when the transition condition is satisfied in a case where a magnitude of the prediction increase rate does not fall within a predetermined range based on a magnitude of the increase rate.

3. The control device of a vehicle according to claim 1, wherein the traveling mode control unit further includes a prediction rotational speed acquisition unit configured to, in accordance with the establishment of the transition condition to the second traveling mode, acquire a prediction rotational speed, which is a prediction value of the rotational speed of the internal combustion engine in the case where the traveling mode is shifted to the second traveling mode when the transition condition is satisfied, and
wherein the transition prohibition setting unit prohibits the transition to the second traveling mode when the transition condition is satisfied in a case where a difference between the prediction rotational speed acquired by the prediction rotational speed acquisition unit and the rotational speed of the internal combustion engine when the transition condition is satisfied is equal to or greater than a threshold value.

4. The control device of a vehicle according to claim 3, wherein the traveling mode control unit performs the transition to the second traveling mode when the transition condition is satisfied, in a case where a magnitude of the prediction increase rate falls within a predetermined range based on a magnitude of the increase rate and the difference between the prediction rotational speed and the rotational speed of the internal combustion engine when the transition condition is satisfied is smaller than the threshold value.

5. The control device of a vehicle according to claim 1, wherein when the vehicle is traveling in the first traveling mode, the internal combustion engine control unit increases the rotational speed of the internal combustion engine to a first rotational speed at a first increase rate with an increase in the vehicle speed, decreases the rotational speed to a second rotational speed lower than the first rotational speed when the first rotational speed is reached, and increases the rotational speed from the second rotational speed at a second increase rate with an increase in the vehicle speed, and
wherein the increase rate is an increase rate, among the first increase rate and the second increase rate, when the transition condition is satisfied.

* * * * *